United States Patent [19]

Rawlings

[11] 3,764,162
[45] Oct. 9, 1973

[54] AUTOMATIC LANDING GEAR DEVICE

[75] Inventor: Charles S. Rawlings, Augusta, Kans.

[73] Assignee: The Raymond Lee Organization Inc., New York, N.Y., part interest

[22] Filed: Dec. 21, 1971

[21] Appl. No.: 210,392

[52] U.S. Cl. .............................. 280/150.5, 74/801
[51] Int. Cl. ............................................. B60s 9/04
[58] Field of Search ...................... 280/150.5, 475; 296/117; 74/801, 421 R; 254/86 R

[56] References Cited
UNITED STATES PATENTS
3,472,551   10/1969   Pickles .............................. 296/117
2,863,335   12/1958   Miller ................................. 74/801
2,926,889    3/1960   Obes ............................... 280/150.5
3,526,414    9/1970   Palen ............................... 280/150.5

Primary Examiner—Robert R. Song
Attorney—Howard I. Podell

[57] ABSTRACT

Apparatus to raise or lower the landing gear of semi-trailers, operatable by the driver of the tractor from his cab. A reversible electric motor powers a worm gear that drives a planetary gear system to rotate the gear system which conventionally operates the landing gear ring.

6 Claims, 2 Drawing Figures

PATENTED OCT 9 1973

3,764,162

INVENTOR.
CHARLES S. RAWLINGS
BY Howard I. Podell

AGENT

AUTOMATIC LANDING GEAR DEVICE

SUMMARY OF THE INVENTION

It is the object of this invention to expedite the coupling and uncoupling of semi-trailers and tractors, by permitting the tractor driver from his cab to lower or raise the semi-trailer landing gear, and particularly if the tractor and semi-trailer are equipped with the invention described in my copending application Ser. No. 214,077, filed Dec. 30, 1971 of an Automatic Truck-Trailer Coupling Device which has issued as U.S. Pat. No. 3,719,372 of Mar. 6, 1973.

At present, considerable time and effort is required of the truck driver when he delivers or picks up a semi-trailer. The driver is required to dismount from his cab and to manually crank the landing gear system into place.

In my invention, the rotating mechanism of the conventional landing gear system is connected to a planetary gear unit which is powered by a worm gear driven by a reversible electric motor. This worm gear drive eliminates any possibility that the gears will rotate freely from vibration while in motion. The device is controlled by electric limit switches to ensure that the landing gear is operated within the desired limits of travel.

BRIEF DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 2:
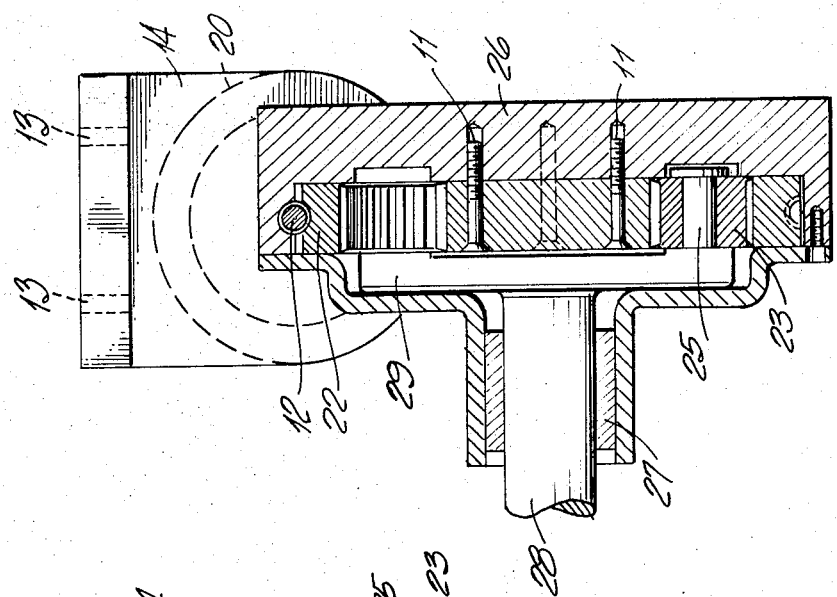
FIG. 2 is a cross-section view through line 2-2 of FIG. 1.
Figure 1:
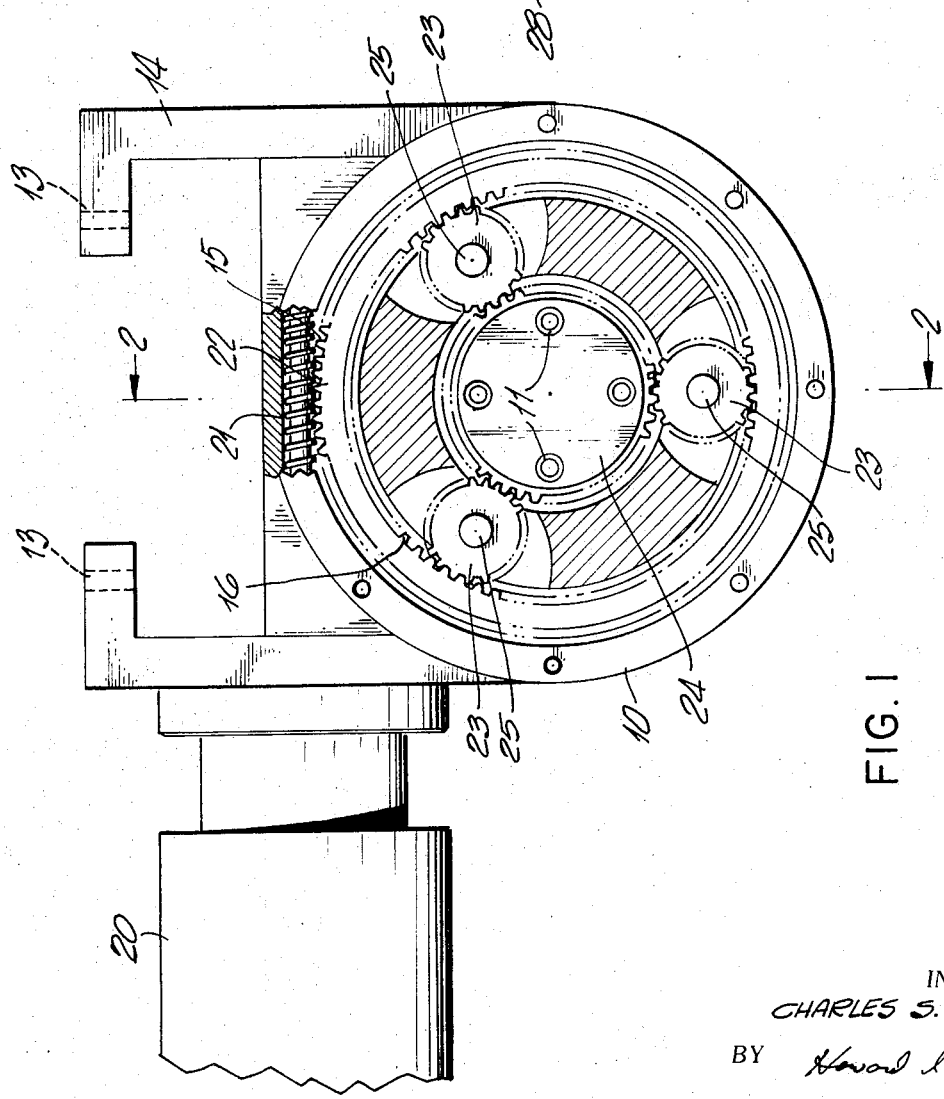
FIG. 1 is a partial cross-section of the planetary gear system, worm gear and drive motor of the apparatus.

Turning now descriptively to the drawing in which similar reference characters denote similar elements throughout the several views, the drive unit 10 of the apparatus is shown in FIG. 1. Electrically reversible motor 20 drives worm gear 21 to rotate ring gear 22 which has both internal 16 and external teeth 15. The external teeth 15 of ring gear 22 mesh with the worm gear 21, while the internal teeth 16 mesh with the three planet gears 23. The planet gears 23 are mounted on axles 25 fixed to carrier 29. Carrier 29 in turn is fixed to drive shaft 28 which is connected to the gear reduction box of the semi-trailer that raises or lowers the landing gears.

The planet gear carrier 29 rotates with the rotation of planet gears 23 since sun gear 24 is fixed to the housing frame 26 by bolts 11 so as not to rotate.

The main frame 14 of the apparatus is fastened to the semi-trailer chassis through bolt holes 13.

In operation, the electric circuitry to operate the motor, and control its direction, as well as the circuitry of the necessary limit switches is connected preferably to the tractor cab by means of the coupling system described in my co-pending application already referred to. However, in the absence of such means of coupling of tractor to semi-trailer, the electrical connections may be made through manually coupled electrical connectors to the tractor cab.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new and desire to secure by Letters Patent of the United States is:

1. A power drive system for elevating or lowering the landing gear assembly of a semi-trailer so that the semi-trailer may be coupled with and uncoupled from a tractor, with said operation controllable from a remote location, said landing gear assembly including a pair of support struts mounted to the underframe of the forward section of a semi-trailer, with the support strut mounting including a mechanism for lowering the bottom of the struts to the ground level for the purpose of supporting the semi-trailer when the semi-trailer is not supported by or coupled to a tractor on which the forward structure of the semi-trailer rests, said support strut mounting including a drive shaft which is rotatably linked with the mechanism of the strut mounting so that rotation of the drive shaft in one direction serves to elevate the bottoms of the support struts to the UP mode of the landing gear assembly, with rotation of the drive shaft in the opposite direction serving to lower the bottoms of the support struts to the DOWN mode of the landing gear assembly, said power drive system comprising an electrically reversible motor mounted to the underframe of the semi-trailer and coupled to a worm gear which meshes with the external teeth of a ring gear, with the internal teeth of said ring gear meshing with several planet gears, said planet gears also meshing with a fixed sun gear, each of said planet gears being rotatably mounted on an individual axle, with each of said axles being mounted to a planet gear carrier member so that each planet gear is free to rotate about the axis of its axle, with said carrier member caused to rotate by the rotating reaction of the planet gears to the rotating ring gear and to the fixed sun gear, when the rotating ring gear is caused to rotate by the motor, said planet gear carrier member being fixed to a shaft that is coupled to the drive shaft of the planet gear carrier assembly of the semi-trailer.

2. A power drive system as described in claim 1 in which all electrical control wires and electrical power wires of the system on the semi-trailer are coupled to the tractor when the semi-trailer is coupled to the tractor.

3. A power drive system as described in claim 2 in which all control switches required to operate the system are in the operator's cab in the tractor.

4. A power drive system as described in claim 1 in which plug-in electrical connectors are mounted on the semi-trailer so that external electric power may be connected to the semi-trailer to power and control the system.

5. A power drive system as described in claim 1 in which the upwards motion of the struts of the landing gear assembly of the semi-trailer is automatically halted when a member of the landing gear system triggers an UP limit switch, said UP limit switch in the triggered condition acting to disconnect the electrical circuit to the electric motor when the said electric circuit is switched so as to cause the electric motor to elevate the bottom of the struts from the DOWN position to the UP position, said UP limit switch being mounted to the underframe structure of the semi-trailer and located so as to be triggered when the bottoms of the support struts are elevated to their desired UP position when the semi-trailer is coupled to a tractor.

6. A power drive system as described in claim 1 in which the downwards motion of the struts of the landing gear assembly is halted when a DOWN limit switch is triggered by a member of the landing gear system and when the electric circuit controlling the motor is switched so as to cause the motor to lower the bottoms of the struts, said DOWN limit switch being mounted to the underframe structure of the semi-trailer and located so as to be triggered when the bottoms of the support struts are lowered to the desired position for supporting the forward section of the semi-trailer.

* * * * *